United States Patent
Al-Harthi

(10) Patent No.: US 7,782,803 B2
(45) Date of Patent: Aug. 24, 2010

(54) HALF-DUPLEX WIRELESS NETWORK SCHEDULING

(75) Inventor: Saleh Al-Harthi, Riyadh (SA)

(73) Assignee: The Regents of University of California, Oakland, CA (US)

(*) Notice: Subject to any disclaimer, the term of this patent is extended or adjusted under 35 U.S.C. 154(b) by 1308 days.

(21) Appl. No.: 10/981,402

(22) Filed: Nov. 4, 2004

(65) Prior Publication Data

US 2005/0152291 A1 Jul. 14, 2005

Related U.S. Application Data

(60) Provisional application No. 60/517,292, filed on Nov. 4, 2003.

(51) Int. Cl.
*H04B 7/00* (2006.01)

(52) U.S. Cl. .................... 370/277; 370/395.4

(58) Field of Classification Search .......... 370/277, 370/335, 346, 296, 328, 329, 336, 337, 342, 370/395.4, 449
See application file for complete search history.

(56) References Cited

U.S. PATENT DOCUMENTS

| | | | | |
|---|---|---|---|---|
| 7,222,160 | B2* | 5/2007 | Hlasny | 709/217 |
| 2002/0086678 | A1* | 7/2002 | Salokannel et al. | 455/452 |
| 2002/0118666 | A1* | 8/2002 | Stanwood et al. | 370/345 |
| 2004/0057469 | A1* | 3/2004 | Nuss et al. | 370/535 |
| 2004/0085981 | A1* | 5/2004 | Lee et al. | 370/412 |
| 2004/0110508 | A1* | 6/2004 | Haartsen | 455/445 |
| 2006/0089119 | A1* | 4/2006 | Lipasti et al. | 455/410 |

OTHER PUBLICATIONS

"Specification of the Bluetooth System", Version 2.0 + EDR, vol. 0, Nov. 4, 2004.
IEEE Std 802.15.1, "Part 15.1: Wireless Medium Access Control (MAC) and Physical Layer (PHY) Specifications for Wireless Personal Area Networks (WPANs)", Jun. 14, 2002.
IEEE Std 802.15.3, "Part 15.3: Wireless Medium Access Control (MAC) and Physical layer (PHY) Specifications for High Rate Wireless Personal Area Networks (WPANs)", Sep. 29, 2003.
IEEE Std 802.15.4, "Part 15.4: Wireless Medium Access Control (MAC) and Physical Layer (PHY) Specifications for Low-Rate Wireless Personal Area Networks (LR-WPANs)", Oct. 1, 2003.
Jaap Haartsen, "The Bluetooth Radio System", IEEE Personal Communications Magazine, 7(1): 6-14, Feb. 2000.
Saleh Al-Harti and Ramesh Rao, "A Switch Model for Improving Throughput and Power Fairness in Bluetooth Piconets", accepted in IEEE Globecom 2003, Dec. 2003.
S.T. Chuang, A. Goel, N. McKeown, and B. Prabhaker, "Matching Output Queueing with a Combined Input/Output-Queued Switch", IEEE Journal of Selected Areas of Communications, vol. 17, No. 6, Jun. 1999, pp. 1030-1039.

* cited by examiner

*Primary Examiner*—Brian D Nguyen
(74) *Attorney, Agent, or Firm*—Greer, Burns & Crain Ltd.

(57) ABSTRACT

Direct communication between wireless nodes, which may be mobile or fixed or a mixture of mobile and fixed nodes, is permitted under a limitation that each node, for any given transmission period, is permitted to act in half-duplex mode, meaning that in that period it can act as one of a transmitter or receiver, but it cannot both transmit and receive in the same communication period. The nodes communicate according to a schedule provided to them, for example by a broadcast after a poll of nodes is conducted. The scheduling of transmissions in preferred embodiments is conducted by contention resolution.

24 Claims, 3 Drawing Sheets

HALF-DUPLEX WIRELESS NETWORK SCHEDULING

PRIORITY CLAIM

Applicant claims priority benefits under 35 U.S.C. §119 on the basis of Patent Application No. 60/517,292, filed Nov. 4, 2003.

FIELD OF THE INVENTION

A field of the invention is wireless networks.

BACKGROUND

Wireless networks have many advantages, and continue to become more popular. A basic problem in wireless networks is the limited resources available for communications between nodes in the networks. Packet transmission must overcome problems inherent to wireless communications. Noise, distance, frequency allocations, and conflicts between nodes are some problems faced in wireless networks. In addition, power resources are considered scarce and critical for mobile wireless nodes.

Accordingly, the standards that have developed for wireless network communications must provide a communication scheme that is reliable and efficient in view of the limitations imposed by the communication medium and other resources. Bluetooth is an example scheme. In Bluetooth, a master node controls communications among a group including the master and a set of slaves. In Bluetooth, the master acts as a relay for all network communications, and schedules communications to avoid conflicts, e.g., more than one source node are addressing the same destination node.

Other communication standards and techniques in wireless networks also have limitations. There remains a need for an improved wireless network scheduling method and system. The invention is directed to this need.

SUMMARY OF THE INVENTION

In embodiments of the invention, direct communication between wireless nodes, which may be mobile or fixed or a mixture of mobile and fixed nodes, is permitted under a limitation that each node, for any given transmission period, is permitted to act in half-duplex mode, meaning that in that period it can act as one of a transmitter or receiver, but it cannot both transmit and receive in the same communication period. The nodes communicate according to a schedule provided to them, for example by a broadcast after a poll of nodes is conducted. The scheduling of transmissions in preferred embodiments is conducted by contention resolution.

In a preferred network, a node acts as a master node. The master then, considering its own needs as well, determines a schedule for one transmission period or multiple transmission periods, applying the limitation that in any given period, each node is permitted to act as either a transmitter or receiver. The schedule is provided to the slave nodes, for example by a broadcast. The slave nodes (and the master) then communicate directly according to the schedule received by slaves from the master.

DETAILED DESCRIPTION OF THE INVENTION

Figure 1:
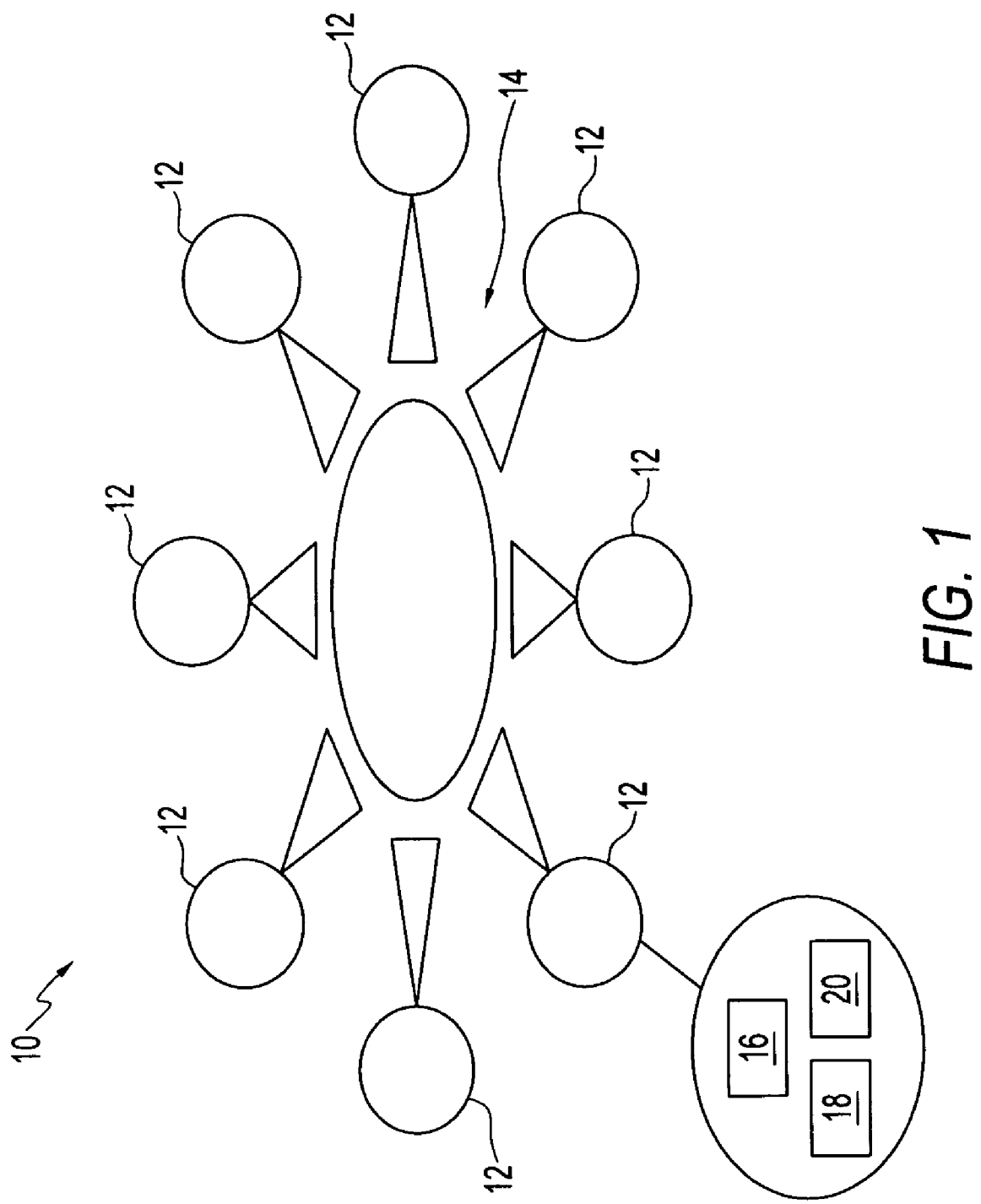
FIG. 1 is a schematic diagram of an example network of the invention.

A preferred network of the invention includes a master node. The master node gathers information about the needs of slave nodes for scheduling transmissions. The master then, considering its own needs as well, determines a schedule for one transmission period or multiple transmission periods, applying the limitation that in any given period, each node is permitted to act as either a transmitter or receiver. The schedule is provided to the slave nodes, for example by a broadcast. The slave nodes (and the master) then communicate directly according to the schedule received by slaves from the master. Communications do not proceed through the master. In a certain embodiment, a master recognizes a very low traffic period, and conducts an expedited communication. In a certain embodiment, the master may also apply fairness guarantees to all nodes, for example, during times of high levels of communication. Other guarantees maybe provided in certain embodiments. For example, a maximum delay per packet for each source-destination flow may be guaranteed.

Embodiments of the invention are directed to ad-hoc networks, which may include two or more mobile nodes. An ad-hoc network may be defined as an autonomous system of nodes. The system may or may not connect to a fixed network such as the Internet. The need for these networks or autonomous systems is implicit in the name, and many special situations and specific applications require these networks. For example, industrial cooperative data exchange, nomadic computing, "wearable" computing, IP-compliant services for mobile nodes, and fire/safety/rescue operations communications may make use of mobile ad-hoc networks. These few example uses are non-exhaustive of the current uses for such networks, and their futures uses will increase beyond the present uses. This has lead to the development of communication standards and regulations for the networks. Bluetooth is an example communication standard that is now commercially popular and is finding its way into many devices. A particular type of ad-hoc network is the personal area network (PAN).

Preferred embodiments of the invention include single-hop networks. Such networks, in accordance with above and below embodiments, for example, have a master provide a schedule where each node directly communicates with its respective transmitter or respective receiver. In other embodiments of the invention, multi-hops are permitted, for example in the case where certain nodes are unable to communicate directly. The half-duplex limitation in this instance means that a node serving as a relay is incapable of being a source and destination node during the communication period during which it is acting as a relay. In an embodiment, two slots may be provided for a relay node. During a first slot it receives, meeting the half duplex limitation. During a second slot it transmits (relays) meeting the half duplex limitation. The master may make determinations as to when multi-hops are required based upon knowledge of the network. In addition, a master node may, in response to a failure of a single hop communication, designate a retry through a multi-hop. In other embodiments, distributed algorithms maybe used to establish multiple independent single-hop networks which could join together to form a multi-hop network.

Preferred methods and systems of the invention impose a half-duplex limitation on wireless node communications. Wireless nodes maintain queues of packets for transmission. Wireless nodes transmit information about their queues and intended destinations of their transmissions to a master node. Based upon received information about the queues and intended destinations, the master node creates a scheduling problem, treating nodes in the network in a fashion similar to the manner of a switch fabric in a packet switch, such as an asynchronous transfer mode switch. The master node will then send a schedule, mimicking a switching decision, to nodes. In the schedule, each node (depending upon its status in a particular communication slot as a transmitter or receiver) is treated as if it were one of an input port or an output port in a cross bar switch. In embodiments of the invention, quality of service, conflict resolution, fairness techniques, etc. from switching may be applied to wireless network communications, for example, in a personal area network. A preferred method and system is a modified Bluetooth network.

A master node in some embodiments of the invention communicates with slave nodes on a designated frequency (or channels), with other frequencies (or channels) available for scheduled data transmissions. In other embodiments of the invention, the master communicates in a shared channel, for example, a CDMA (code division multiple access) system may be implemented.

In a method of the invention, slaves communicate requests to a master. The master computes a conflict-free matching between requesting transmitters and receivers. The schedule limits each node to either a transmitter or receiver for each time slot. The master then conveys the schedule to nodes that are scheduled, or to all nodes. Additional features of the invention will be apparent from the following description of exemplary embodiments and the referenced drawings.

FIG. 1 shows an example network 10 including a plurality of nodes 12 that connect via a wireless communication channel(s) 14. The medium 14 may include a number of available frequencies and may be defined by a particular communication standard. Embodiments of the invention included a modified Bluethooth network, and take advantage of the 2002 Federal Communications Commission, "Amendment of part 15 of the commission's rules regarding spread spectrum devices, second report and order." FCC 02-151, May 30, 2002. In the modified Bluetooth embodiment, through frequency, code, and/or time diversity, the nodes 12 in the network 10 can talk simultaneously and directly to one another without collisions according to a schedule determined by one of the nodes 12. The node that determines the schedule for any particular time period will be referred to as the master. Normally, in active network, one node will consistently act as the master, but that is not necessary. Other nodes may also be capable of acting as a master. Any node that can compute a schedule may act as a master. In a preferred embodiment, each node is equally capable of being a master so that a rotating algorithm may be used to rotate the responsibility of being a master from one node to another in any desired way, for example to achieve power fairness. An example of such a rotating algorithm is to rotate the responsibility of being a master among all nodes in equal shares of time. Another example of a rotating algorithm is to designate a particular node to act as a master during an entire communication session. The latter type of rotating algorithm may be applied, for example, if a power resource is abundant for a particular node. With the invention, the network 10 is treated as an autonomous system of N nodes 12 and when combined with the wireless channel as an N×N switch. Each mobile node is assumed to have a single transmitter 16 and a single receiver 18. In practice and for economical reasons, the single transmitter and single receiver on a mobile node are usually combined in a single "transceiver" which alternates between a transmitter and a receiver.

One of the nodes 12 acts as a master node and performs the scheduling in the network 10. The master node collects, via a control channel, global network information. The master node determines a schedule using, for example, a slotted system and a matching algorithm to match transmitters to their intended receivers. There is no need for a transmitter to transmit to the receiver on the same node. Therefore, the possibility of a transmitter sending to the receiver on the same node is disallowed.

The resulting system of N transmitters and N receivers, with exactly one transceiver on each node, along with the wireless channel, can be modeled as a special case of an N×N switch. The N transmitters can be thought of as N input ports and the N receivers as N output ports. The centralized scheduler (master) node is modeled as the arbiter or scheduler of the switch, while the wireless channel is modeled as the switching-fabric (or cross bar). In a preferred embodiment, the model assumes that each node's transmission can reach any of the other nodes including the master. It is also assumed that enough distinct channels (frequencies) are available in each scheduling opportunity and that each transmitter and each receiver can tune in to any of these frequencies. In other embodiments, a Code Division Multiple Access (CDMA) system may be used to provide separate channels. Each node 12 includes a queue 20, which may logically or physically include multiple queues. The node transmits (from its queues) only when granted by the central scheduler on a specified frequency or code. The queue 20 is preferably arranged as a set of virtual queues, with a separate virtual queue for each destination node.

In an example embodiment, the central scheduler determines the distribution of frequencies or codes and provides the schedule, during a granting phase, to the nodes having requested, during a polling phase, to act as transmitters. In this embodiment, the schedule model can be represented by the bipartite graph depicted in FIG. 2. This bipartite graph has the same number of nodes 12 on the left and on the right. A dotted horizontal line is used to indicate a disallowed schedule, i.e., that the transmitter and the receiver coupled by the dotted line exist in the same node.

Figure 2:
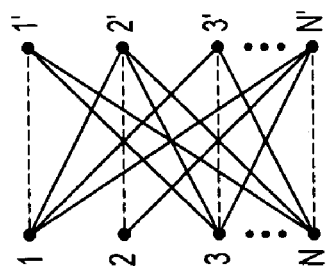
FIG. 2 is bipartite graph illustrating a half-duplex constrained schedule matching map of the invention.

The graph of FIG. 2 will be referred to as the N-Node Bipartite Graph (NNBG). Any matching schedule in an NNBG that follows the half-duplex principle (or constraint) will work. This is any schedule in which a node cannot transmit to itself, and cannot be scheduled to transmit and receive in the same time slot. A time-slot in the network is on the order of the time period required for a packet to be queued in a transmitting node. The scheduler (master) may use a matching phase that can be a fraction of the time-slot. There may be multiple matching phases in a single time-slot. In this way, a schedule encompassing a number of time slots with different matchings may be determined by the scheduler and transmitted to the nodes.

The arbitration delay in preferred embodiments is bounded for any half-duplex constrained matching schedule under certain conditions. For there to be a delay bound either the transmitter is assumed to be able to transmit s times (a speed up parameter similar to that found in the art of cross bar switches) faster than the desired aggregate speed (bps) or the aggregate throughput of the transmitter is 1/s the throughput of a full dedicated channel of capacity. For the half-duplex networks of the invention the speed up parameter is >4. A further reduction in the speed up parameter may be achieved at the expense of guaranteed throughput. Generally, this can be realized because it may not be necessary to achieve full throughput at each transmitter. For example, it is possible to reduce the throughput of each transmitter to ⅛ of full throughput, and at this throughput no speedup is required at all (s=1) to achieve a delay bound. This is not a large reduction in throughput when compared to the throughput achieved by a transmitter in a typical (equivalent) Bluetooth piconet. In a typical (heavily loaded) Bluetooth piconet, the half-duplex condition of each node reduces the maximum attainable throughput by any transmitter to at most half the full capacity of the transmitter. If there are seven active slaves in the piconet, the maximum attainable throughput of each transmitter reduces further to much less than ⅛, considering the master overhead. In a conventional Bluetooth network, throughput is more severely limited because there is only one channel (in a single time-slot) and traffic must be relayed through the master.

Embodiments of the invention use a dedicated control channel in parallel with a data channel. The control channel is used to conduct polling and to transmit (in the case of a master) or receive the schedule. The control channel may be a parallel control channel or may be an in-band control channel. For the matching implemented in a network of the invention to work, communications between the nodes and the master are necessary. In an embodiment of the invention, this is achieved with a Medium Access Control (MAC) protocol. A suitable MAC protocol may be based on the well known approach of using a limited period of contention resolution followed by contention-free period in which sources that won during the contention period are guaranteed to transmit.

Other embodiments of the invention implement a control channel by a polling conducted by the scheduling (master) node. A particular embodiment using the polling is a modified Bluetooth network, and this embodiment will now be discussed in detail as an example.

Consider an established Bluetooth piconet with K slaves and N=K+1 nodes, including a master node. According to the Bluetooth specification, the communication channel is defined as a pseudo-random hopping-sequence determined by the Master's ID and clock. Assume that each node in the piconet (active or non-active) is uniquely identified by a 1-byte address, where an all-zeros 8-bit address identifies the master. This accommodates a large piconet, suitable for many uses. The 1-byte identifier extends the maximum allowable number of active slaves in a piconet beyond 7. In other embodiments, where the application of the piconet does not require the number of active slaves to exceed 7, the 3-bit Active Member Address of Bluetooth, AM_ADDR, may be used instead.

The basic task is to look ahead in the channel hopping-sequence (known to all members of the piconet) and use a different hop-frequency for each pair of nodes that want to communicate with each other during the next time-slot. To do that without collisions, a centralized algorithm is needed to assign different frequencies from the channel hopping-sequence to different communicating pairs. The master is still the centralized node that performs this centralized algorithm, however, in this invention (and different from the current standard Bluetooth specification) the traffic does not need to be relayed by the master. During each Bluetooth time-slot, each two communicating nodes are matched directly to each other using a distinct hop-frequency. The master implements an algorithm to assign hop-frequencies to all communicating pairs in the piconet without collision. By permitting multiple pairs to communicate during the same time-slot in parallel, a gain in the overall throughput of the piconet is achieved.

In order to match communicating nodes without collision, the preferred embodiment uses three basic steps in the following order. First, the slaves communicate to the master their requests, which could be, for example, the destination nodes of their transmissions and the size of their queues for each of those destinations. Second, the master computes a conflict-free half-duplex constrained matching between requesting transmitters and their intended receivers. Third, the master conveys the computed schedule to all slaves (not only the requesting slaves). The schedule could be computed for the next Bluetooth time-slot or for the next several time-slots. The three basic steps of the preferred embodiment can be implemented in many different ways.

The required communications in the first and third steps represent a communication overhead of scheduling. To minimize this overhead and to easily support time-sensitive data, a preferred embodiment uses polling to implement the first step and a broadcast scheme (by the master) to implement the third step. The second step is preferably implemented using either a maximum or a maximal matching.

The basic 3-step algorithm repeats every F time-slots, where F, the frame-length, is variable. First, the master polls the slaves. Assume that P time-slots are used for polling. Typically P=1, however, an embodiment sets $1 \leq P \leq 3$. Second, the slaves respond. The slaves' response takes a predefined number of time-slots R that depends on the number of active slaves, K. Typically, R=K, however, for reliability, $K \leq R \leq \alpha K$, where $\alpha$ is a positive integer chosen, for example, such that $\alpha \leq 3$. This means that a slave may have up to 3 time-slots to repeat its request in a bad wireless channel. Third, the master broadcasts a schedule using B time-slots. Similar to the polling, typically B=1, however, an embodiment sets $1 \leq B \leq 3$. Lastly, the nodes are interconnected. Denote the actual number of time-slots used for the interconnection by the letter I. The maximum number of time-slots scheduled by the master in any frame is defined as $T_{sch\_max}$. Thus, $1 \leq I \leq T_{sch\_max}$. The parameter $T_{sch\_max}$ is determined by the maximum number of bits allocated for queue-information in each requesting-packet of active slaves. For example, if the queue-information field is selected as 6-bits long, then under heavy load condition, $I=T_{sch\_max}=64$.

Figure 3:
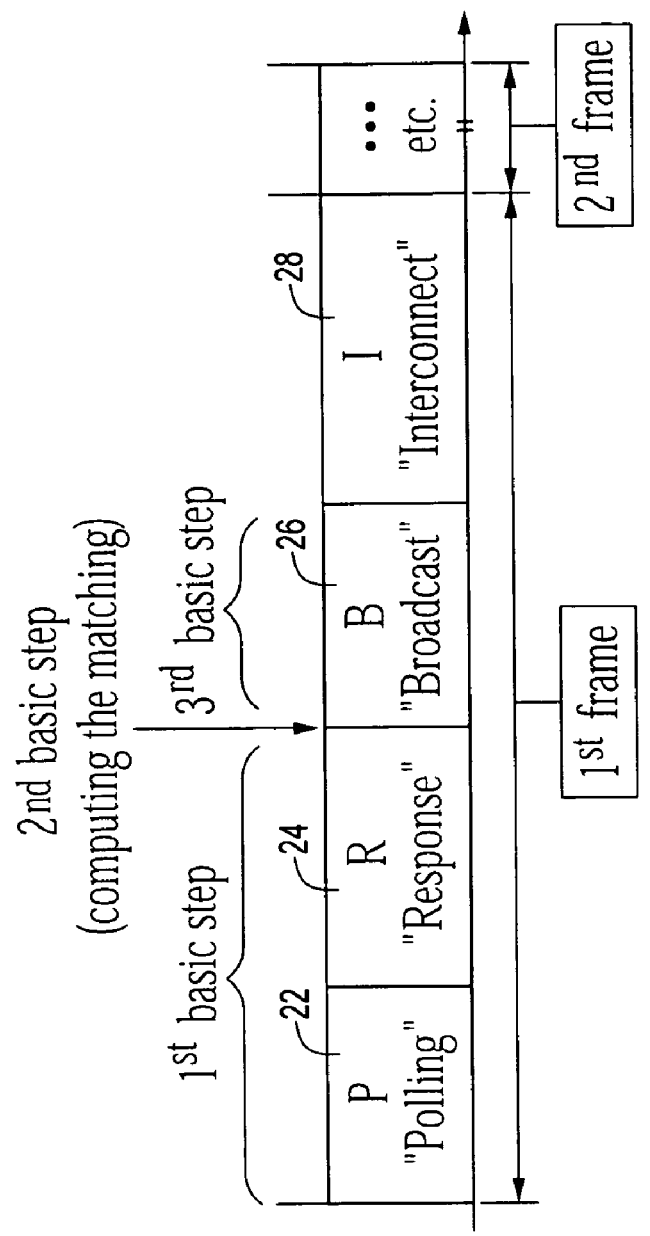
FIG. 3 shows an example variable length frame structure for use in a network of the invention.

FIG. 3 shows a preferred general frame structure for use in a network of the invention. The variable length frame of FIG. 3 repeats every F time slots. The first basic step includes a poll by the master 22 and a response 24. The master then computes a half-duplex constrained matching schedule and the schedule(s), are broadcast 26. Communications occur during interconnect slots 28. The variable length of the frame is $F=P+R+B+I$ and $K+3 \leq F \leq 3K+T_{sch\_max}+6$. In a special case, when the there is only one active slave node, then the polling, response, etc, becomes unnecessary and the communications proceed for that special case according to conventional Bluetooth, with the channel being time-divided equally between the master and the slave in an alternating fashion.

A preferred packet structure for implementing the frame of FIG. 3 will now be discussed. A polling-packet will first be defined. In a Bluetooth network, the master always knows the number of active members in its piconet, which has been defined as K. To avoid collisions, slaves may submit their requests only after the master broadcasts a polling packet to poll slaves to submit their requests in a predefined form. Since some slaves could be parked and since a slave may not be aware of all other slaves in the piconet, the polling packet contains a list of identifiers for the current active members of the piconet. As discussed earlier, to accommodate N=256 in a piconet, 1-byte identifiers are used. Hence, the polling packet is simply a list of 1-byte identifiers.

In response to the polling packet, slaves submit requests. Only the slaves listed in the polling packet are permitted to respond in the following Bluetooth slots. The response follows the same order in which their identifiers were listed in the polling packet by the master. In an alternate embodiment, CDMA is used so that the slaves may respond in the same time slot, further reducing overhead. The master will receive K responses on top of each other. CDMA makes it possible for the master to extract each slave's response from the over talk noise using orthogonal codes. In either case, slaves not listed in the polling packet may not respond.

Figure 4:
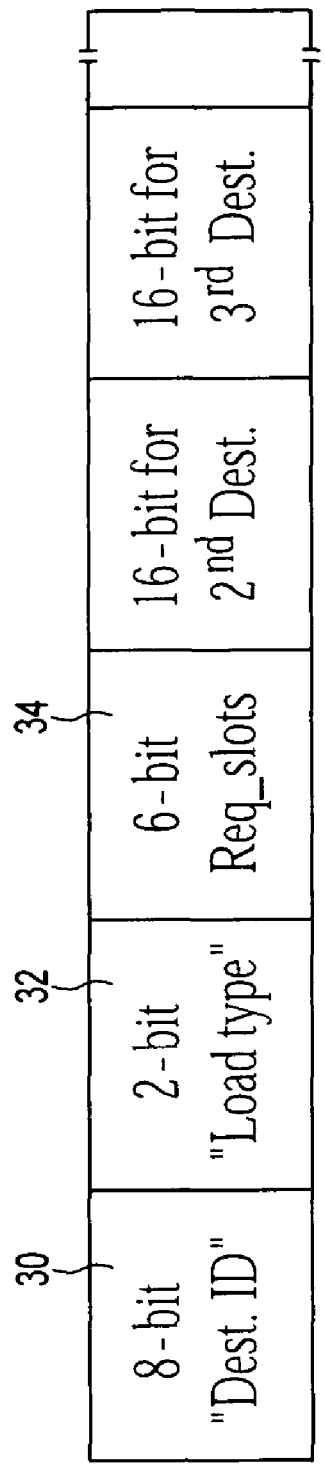
FIG. 4 shows an example questing packet structure for use in a network of the invention.

A particular format of the payload of requesting-packets used by slaves will now be defined. In the preferred embodiments, each node keeps virtual queues at its transmitter such that each queue holds data destined to a distinct node in the piconet (including possibly the master). FIG. 4 depicts the format of a requesting packet. Each slave submits a list of destinations in the following form. Each destination requires a 2-byte description: The first byte 30 is the identifier (address) of the destination and the second byte describes the requested load. The second byte is divided into two subfields, a 2-bit subfield 32 describing the type of data (voice, video, data, or others), and a 6-bit subfield 34 containing an integer representing the estimated number of time-slots required to transfer the queued data at the maximum possible payload of a single-slot Bluetooth packet (about 29 bytes). The value 64 is used whenever the required number of time-slots is greater than or equal to 64. The 6-bit field allows the slave to request up to 64 Bluetooth time-slots in the future. This reduces the scheduling overhead by allowing the master to schedule for the next 64 time-slots without the need to poll the slaves. When a slave is granted (by the master) a chance to transmit, it is up to that slave to choose what type of Bluetooth single-slot packet types to send. It is desirable to allow a slave to submit requests to as many other nodes as possible using the smallest possible Bluetooth packet. The AUX1 packet of the current Bluetooth specification has the largest payload of 29 bytes among all single-slot packet types. Therefore, the AUX1 packet is preferable for submitting slave requests. Since the maximum payload of AUX1 is 29 bytes, this implies that each (active) slave may submit requests for up to 14 distinct (active and non-active) destinations in a single-slot requesting-packet. Note that this represents double the maximum number of active slaves in a piconet of the current specification of Bluetooth. Note also that if more than 14 destinations need to be requested by a slave, then the slave may use multiple requesting-packets. Alternatively, the maximum payload of single-slot Bluetooth packets may be increased.

Once the master has all requests from all active slaves, then considering its own requests, the master computes a half duplex constrained matching. Any maximal matching is suitable, though a maximum matching (making the optimal use of resources) may be used. However, a maximal matching is advantageous due to the ease of computation, and provides good performance. The master may also apply, for example, fairness guarantees and other techniques such as those typically used in the art of ATM (asynchronous transfer mode) cross bar switches. An example fairness guarantee is that no active slave is starved from sending to any other slave for a period more than it normally would in a round robin scheme that allows each node to send to each other node in the network. For example, under a heavy load condition, no slave in a piconet of K active slaves is starved from sending to any other member (a slave or the master) in the piconet for more than $2K^2+Z$ consecutive time-slots, where $Z \leq K$ is a constant. In the 2.4 GHz license-free ISM bands, 79 channels, each 1-MHz wide, are available for Bluetooth. A single piconet should not be allowed to use all 79 available channels, however, and prevent co-existing others (in time and space) from utilizing the resource. In the current specification, a Bluetooth piconet can use at most one channel in each time-slot. In the invention, a piconet may use more than one channel concurrently in a single time-slot. The maximum number of channels, however, available to one piconet can be set to permit a reasonable number of other piconets to coexist (in time and space). A tradeoff exists between throughput and graceful coexistence (in time and space) with other piconets or scatternets.

Figure 5:
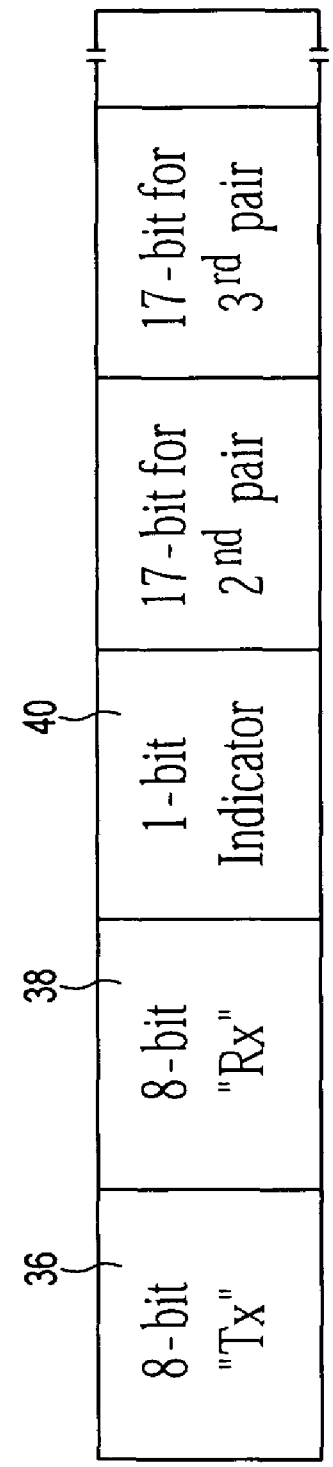
FIG. 5 shows an example schedule broadcast packet for use in a network of the invention.

After the schedule is computed, the master broadcasts the schedule. The schedule is essentially a set of computed matchings, where the set contains L matchings, where, similar to the definition of the parameter I discussed above, $1 \leq L \leq T_{sch\_max}$. Each matching is to be executed over a distinct Bluetooth time-slot. Each communicating pair in a matching tunes in to a hop-frequency, and a preferred manner for hop frequency assignment will be discussed below. FIG. 5 shows an example schedule broadcast packet. If it is assumed that a maximum of N=256 nodes may need to be matched, then, in this case, a list of the 8-bit member-addresses will suffice to convey the schedule to the members. Therefore, a 16-bit field is sufficient to describe the two nodes matched to each other, where, by definition, the first 8-bit field 36 indicates the transmitter and the second 8-bit field 38 indicates the intended receiver. An additional 1-bit field 40 is added to this 16-bit field forming a 17-bit field per communicating pair in a matching. The 1-bit is used to delineate the beginning (and the end) of a new matching in the set of matchings carried in a single broadcast packet. Consider the ordered set of matched-pairs constituting the set of matchings. The single bit is initially set to zero in the first listed matched-pair then inverted whenever a listed matched-pair belongs to a new matching of the set. Once a slave receives the schedule broadcast, it will be able to determine how many matchings are in the broadcast packet, and whether it is matched (as a transmitter or a receiver) in each of them.

All communicating pairs during a given Bluetooth time-slot need to know what hop frequency they should tune in to whether transmitting or receiving. A new kernel or the same kernel specified in the current Bluetooth specification to generate the hopping sequence may be used in conjunction with the following algorithm. Assume that the master broadcasts a polling packet at time-slot 0 on some frequency, f(0), of the hopping sequence. Since the polling packet has an ordered list of K active members, let each member i of this list have the $i^{th}$ hop, f(i), among the following K hops of the sequence, dedicated to its response during the $i^{th}$ time-slot of the next K time-slots. Therefore, the $(K+1)^{th}$ hop in the sequence, f(K+1), is the hop where all members should tune in to receive the broadcast schedule from the master during the $(K+1)^{th}$ time-slot. Once the nodes receive the schedule, the hop to be used by each transmit/receive pair as well as who transmits and who receives for each matched pair are encoded in the format of the schedule as described above. Note that since each slave receives the full schedule list, each slave can determine all used hops in the sequence for this schedule and hence can determine the correct hop at the end of this schedule frame, which will be used by the master to broadcast the next polling packet.

According to the recent amendments of the rules governing the ISM bands by the FCC [Federal Communications Commission, "Amendment of part 15 of the commission's rules regarding spread spectrum devices, second report and order." FCC 02-151, May 30, 2002], it is possible to accommodate up to K≦9, using at most 5 concurrent (frequency) channels in each time-slot. For delay, it may be shown that, if we restrict K≦·7, as in Bluetooth, then a maximum delay on the order of 11.25 ms is guaranteed for each active slave in a piconet of the invention to get its chance to access the channel.

In alternate embodiments of the invention, nodes and scheduling are modified to include multi-hop networks, where each node is not assumed to be in range with all other active nodes. The invention thus includes the formation of scatternets. In one embodiment, the master acts as a slave in another piconet and forwards the traffic from its piconet to the master of the other piconet. In another embodiment, a slave could act as a bridge or gateway to forward traffic to multiple piconets. The master recognizes destinations that require a hop to another piconet, and allocates matchings accordingly. For example, a node recognized as acting as a bridge can be allocated consecutive receive and transmit slots to receive and forward a packet.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for wireless network communications with quality-of-service guarantees, the method comprising steps of:
   receiving slave node communication requests at a master node;
   determining a conflict free schedule at the master node according to the need of slave nodes and the master node to communicate in a communication slot being scheduled, where for each communication slot being scheduled every node participating in the conflict free schedule is limited to being only one of a transmitter or receiver for each communication slot;
   supplying the conflict-free schedule to slave nodes; and
   communicating, by nodes scheduled in the conflict free schedule, in accordance with the conflict free schedule.

2. The method of claim 1, wherein said step of receiving slave node communication requests comprises:
   polling by the master node; and
   receiving responses to said polling from one or more slave nodes.

3. The method of claim 2, wherein said step of receiving responses to said polling comprises receiving responses from a plurality of the slave nodes simultaneously and the master using CDMA to extract the response of individual slave nodes.

4. The method of claim 2, wherein said step of receiving responses to said polling comprises receiving responses from a plurality of the slave nodes sequentially.

5. The method of claim 2, wherein said polling step is conducted using a packet having a list of active members and said step of receiving responses to said polling receives responses from all active members.

6. The method of claim 1, wherein the slave node communication requests comprise a packet having bits allocated for identifying at least one destination identification, a data type, and a number of requested slots.

7. The method of claim 6, wherein said step of supplying comprises broadcasting, by the master node.

8. The method of claim 7, wherein said step of broadcasting comprises broadcasting a packet having an ordered list of transmitting and receiving node pairs, with each set of transmitting and receiving node pairs being separated by an indicator bit.

9. The method of claim 1, further comprising a step of designating a node in the wireless network to be the master node.

10. The method of claim 9, wherein said step of designating comprises rotating responsibility for being the master node among nodes in the network.

11. The method of claim 1, wherein
   the master and slave nodes queue packets destined for other nodes; and
   the master node includes a scheduler that determines the conflict free schedule under a half-duplex limitation for each communication slot being scheduled by conflict resolution.

12. The method of claim 11, wherein the scheduler treats nodes as input and output ports and applies a cross bar switching algorithm to determine the conflict free schedule.

13. The method according to claim 1, applied as a modified Bluetooth network communication method.

14. The method of claim 1, wherein said step of determining comprises:
   modeling nodes and a communication channel being scheduled as a N×N switch, wherein each node that will transmit in the conflict free schedule is modeled as one of N output ports and each node that will receive in the conflict free schedule is modeled as one of N input ports;
   matching nodes that will transmit with nodes that will receive in a pattern that avoids collisions to determine the conflict free schedule.

15. The method of claim 14, wherein said step of determining models the communication channel as a cross bar switch fabric.

16. The method of claim 1, wherein: said step of receiving slave node communication requests comprises the slaves communicating destination nodes of their transmissions and the size of their queues for each of those destination nodes;
   said step of determining comprises the master node computing the conflict free schedule as half-duplex constrained matching between requesting slave nodes and their intended receivers for at least a next communication slot.

17. The method of claim 16, wherein said step of determining computes the conflict free schedule for a plurality time slots in advance.

18. The method of claim 1, wherein said step of communicating comprises the nodes scheduled communicating directly with each other.

19. A method for wireless network communications with quality-of-service guarantees, the method comprising steps of:
   at nodes in the network, holding data in virtual queues according to intended destinations for the data;
   requesting permission from a master node to transmit data to destination nodes;
   receiving a conflict free schedule for all nodes in the network, where for each communication slot being scheduled a node is limited to acting as only one of a transmitter or receiver;
   if the conflict free schedule provides permission to transmit, then transmitting in accordance with the conflict free schedule; and if the conflict free schedule provides instruction to receive, then receiving in accordance with the conflict free schedule; wherein said steps of transmitting and receiving are never conducted simultaneously by the same node.

20. The method of claim 19, wherein said step of requesting comprises:
waiting for a poll by the master node; and
responding to the poll.

21. The method of claim 19, wherein the conflict free schedule is conducted among the master node and a list of active member nodes and said step of transmitting is conducted by all active member nodes.

22. The method of claim 19, wherein said step of requesting permission comprises sending a packet having bits allocated for identifying at least one destination identification, a data type, and a number of requested slots.

23. The method of claim 22, wherein said step of receiving comprises receiving a broadcast packet.

24. The method of claim 23, wherein said broadcast packet includes an ordered list of transmitting and receiving node pairs, with each set of transmitting and receiving node pairs being separated by an indicator bit.

* * * * *

UNITED STATES PATENT AND TRADEMARK OFFICE
CERTIFICATE OF CORRECTION

PATENT NO. : 7,782,803 B2  
APPLICATION NO. : 10/981402  
DATED : August 24, 2010  
INVENTOR(S) : Saleh Al-Harthi Page 1 of 1

It is certified that error appears in the above-identified patent and that said Letters Patent is hereby corrected as shown below:

On the Title Page

In Item (73) Assignee: Please delete "The Regents of University of California, Oakland, CA (U.S.)" and insert --The Regents of the University of California, Oakland, CA (U.S.)-- therefor.

Col. 2, line 27  Please delete "maybe" and insert --may be-- therefor.

Col. 2, line 67  Please delete "maybe" and insert --may be-- therefor.

Col. 6, line 53  Please delete the first instance of "the".

Col. 8, line 54  Please delete "$(K+_1)^{th}$" and insert --$(K+1)^{th}$-- therefor.

Col. 9, line 6  Please delete "$K \leqq \cdot 7$" and insert --$K \leqq 7$-- therefor.

Signed and Sealed this  
Fifteenth Day of February, 2011

David J. Kappos  
*Director of the United States Patent and Trademark Office*